J. L. VAN STEENBURG.
LUBRICATING TROLLEY WHEEL.
APPLICATION FILED OCT. 21, 1912.
1,105,470.
Patented July 28, 1914.
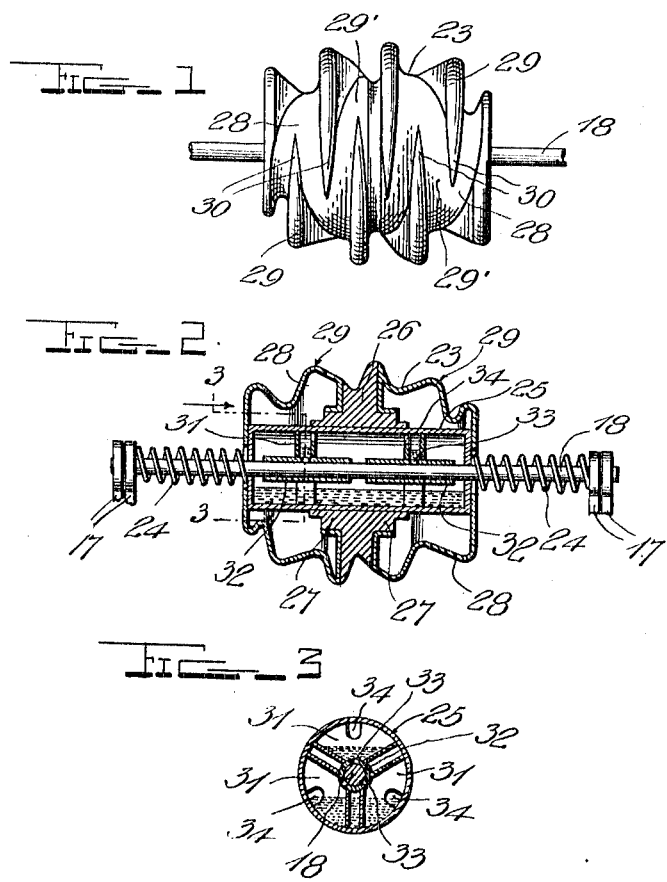

UNITED STATES PATENT OFFICE.

JOHN L. VAN STEENBURG, OF ERIE, PENNSYLVANIA.

LUBRICATING TROLLEY-WHEEL.

1,105,470. Specification of Letters Patent. Patented July 28, 1914.

Application filed October 21, 1912. Serial No. 727,025.

*To all whom it may concern:*

Be it known that I, JOHN L. VAN STEENBURG, a citizen of the United States, residing at Erie, in the county of Erie and State of Pennsylvania, have invented certain new and useful Improvements in Lubricating Trolley-Wheels, of which the following is a specification.

My invention relates to improvements in self-lubricating trolley wheels.

An important object of the invention is to provide means of the above-mentioned character, which is simple in construction, inexpensive to manufacture, and automatic and reliable in operation.

Other objects and advantages of the invention will be apparent during the course of the following description.

In the accompanying drawings forming a part of this specification and in which like numerals are employed to designate like parts throughout the same, Figure 1 is a side elevation of a lubricating trolley wheel embodying my invention. Fig. 2 is a central longitudinal section through the same; and Fig. 3 is a transverse section taken on line 3—3 of Fig. 2.

A trolley wheel 23 is freely journaled on the shaft 18, and coil springs 24 surround the shaft 18 and bear at their inner ends against the sides of the wheel 23. The said springs 24 bear at their outer ends against the upper ends of the arms 17. The springs 24 at the opposite sides of the wheel 23 are opposed to each other and they serve to hold the wheel 23 approximately midway between the upper ends of the members of the pairs of arms 17. The trolley wheel 23 is of especial design and its structure will now be described. The said wheel comprises a cylinder 25 through which the shaft 18 passes longitudinally. A hub 26 is mounted upon the intermediate portion of the cylinder 25 and is provided with shoulders 27. Casings 28 are mounted at their inner ends upon the hub 26 and the shoulders 27 thereof, and at their outer ends fit snugly against the ends of the cylinder 25. These casings are preferably formed from sheet metal, and the entire structure may be of brass or aluminum as desired. The casings 28 are approximately conical in form, and they are provided upon their peripheries with ridges 29, between which are grooves 29'. The ridges are spirally disposed, and while the furrows or grooves between the ridges are continuous or complete, each ridge terminates in a pointed end portion 30, the end portions 30 of adjacent ridges overlapping each other. The ridges at one side of a vertical median line passing through the trolley wheel 23, are disposed opposite to the ridges at the other side of the said median line. Therefore, when the trolley wheel 23 is raised toward the trolley wire 8, should the said wire encounter either end portion of the said wheel, the said ridges and grooves will work the wire along the furrows or grooves between the ridges 29 to the furrow or grooves in the vertical median line of the wheel, which is deeper than the other grooves. This intermediate groove is deeper than the other grooves so that as the wheel moves along the wire, the said wire will continue to travel in the said deeper groove.

Hollow spokes 31 are arranged in the cylinder 25. These spokes are arranged in sets with preferably three spokes to a set. The spokes 31 are sector shaped in a direction transverse of the cylinder 25, Fig. 7, and are very thin in the direction longitudinally of the said cylinder, Fig. 6. Each set of spokes supports at their inner ends a bearing 32. These bearings are journaled upon the shaft 18. The bearings 32 are provided between the opposite sides of the spokes 31 with openings 33, and each spoke 31 is provided in its side and adjacent the inner surface of the cylinder 35 with an opening 34, Figs. 6 and 7.

The cylinder 25 is partially filled with oil, and consequently as the wheel 23 rotates the spokes 31 turn about the axis of the shaft 18, and when the spokes are below the said shaft, the oil from the cylinder 25 flows through the openings 34 into the spokes. As the spokes move above the axis of the shaft 18, the oil is carried upwardly and then flows by gravity through the openings 33 in the bearings 32 to the shaft 18. Thus, the shaft and the said bearings are lubricated. The oil will flow along the shaft until it arrives at the outer ends of the bearings 32 from which points it drips back into the lower portion of the cylinder 25. Thus, oil maintains a constant circulation through the spokes and the bearings as the wheel 23 rotates about the shaft 18 and consequently the wheel 23 is adequately lubricated, and this without appreciable loss of lubricant, which is advantageous because it obviates the necessity of frequently replenishing the supply of lubricant in the cylinder 25.

Having thus described my invention, what I claim is:

A wheel comprising a cylinder interior oil holding casing, a shaft extending axially through the casing, hollow segmental spokes arranged within the interior casing in transverse sets with their apertured outer enlarged ends secured to the periphery of the interior casing and their inner reduced ends provided with apertured sleeves which are rotatably mounted upon the shaft, an annular hub mounted upon the interior casing substantially equidistantly between the ends thereof, and outer casings surrounding the opposite ends of the interior casing to engage the said ends and the ends of the hub.

In testimony whereof I affix my signature in presence of two witnesses.

JOHN L. VAN STEENBURG.

Witnesses:
 CHAS. E. SWARTSFAGER,
 RUTH AMES.

---

Copies of this patent may be obtained for five cents each, by addressing the "Commissioner of Patents, Washington, D. C."